(12) United States Patent
Eberlein et al.

(10) Patent No.: US 11,438,437 B1
(45) Date of Patent: Sep. 6, 2022

(54) LANDSCAPE SIMULATION SYSTEM

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/490,000

(22) Filed: Sep. 30, 2021

(51) Int. Cl.
*G06F 15/173* (2006.01)
*H04L 67/51* (2022.01)
*H04L 43/04* (2022.01)
*H04L 43/0852* (2022.01)
*G06N 5/04* (2006.01)

(52) U.S. Cl.
CPC ............... *H04L 67/51* (2022.05); *G06N 5/04* (2013.01); *H04L 43/04* (2013.01); *H04L 43/0852* (2013.01)

(58) Field of Classification Search
CPC ............. H04L 43/0852; H04L 43/0858; H04L 43/0864; H04L 43/087; H04L 43/0888; H04L 43/10; H04L 43/103; H04L 43/106; H04L 43/12; H04L 43/04; H04L 67/51; G06N 5/04
USPC .................................................. 709/223, 224
See application file for complete search history.

(56) References Cited

U.S. PATENT DOCUMENTS

| | | | | |
|---|---|---|---|---|
| 9,774,401 B1 * | 9/2017 | Borrill | .................. | H04L 9/0852 |
| 10,608,829 B1 * | 3/2020 | Yoshihama | ......... | H04L 43/0858 |
| 2009/0204234 A1 * | 8/2009 | Sustaeta | ............. | G05B 13/0265 700/29 |
| 2009/0204237 A1 * | 8/2009 | Sustaeta | ................. | G06Q 10/04 700/106 |
| 2009/0204245 A1 * | 8/2009 | Sustaeta | ................ | H04L 67/125 700/36 |
| 2010/0069035 A1 * | 3/2010 | Johnson | ............. | G06Q 30/0633 455/566 |

(Continued)

*Primary Examiner* — Thu Ha T Nguyen
(74) *Attorney, Agent, or Firm* — Buckley, Maschoff & Talwalkar LLC

(57) ABSTRACT

Systems and methods include reception of first data representing each of a plurality of calls transmitted between services of a service landscape, the first data representing each call comprising a respective value of an identifier, identification of a first plurality of the plurality of calls as comprising a same value of the identifier, determination, for each outbound call of the first plurality of calls, of a hypothesis associating the outbound call with a time delay relative to a preceding inbound call of the first plurality of calls, reception of second data representing each of a second plurality of calls transmitted between the services of the service landscape while a latency between two services of the service landscape is increased, the second data representing each of the second plurality of calls comprising a second same value of the identifier, determination of an expected timing of each outbound call of the second plurality of calls based on the hypotheses and the increased latency, comparison of the expected timing of each outbound call of the second plurality of calls with a timing of each outbound call of the second plurality of calls, and verification of one or more of the hypotheses based on the comparisons of the expected timing of each outbound call of the second plurality of calls with the timing of each outbound call of the second plurality of calls.

20 Claims, 18 Drawing Sheets

(56) References Cited

U.S. PATENT DOCUMENTS

| | | | | |
|---|---|---|---|---|
| 2012/0069131 A1* | 3/2012 | Abelow | ............ | G06Q 30/0601 |
| | | | | 345/589 |
| 2013/0339498 A1* | 12/2013 | Johnson | ................ | H04L 67/104 |
| | | | | 709/221 |
| 2013/0343207 A1* | 12/2013 | Cook | ................. | H04L 43/0852 |
| | | | | 370/252 |
| 2013/0343378 A1* | 12/2013 | Veteikis | ................. | H04L 63/20 |
| | | | | 370/389 |
| 2013/0343390 A1* | 12/2013 | Moriarty | ................ | H04L 43/50 |
| | | | | 370/392 |
| 2013/0347103 A1* | 12/2013 | Veteikis | ................. | H04L 43/04 |
| | | | | 726/22 |
| 2014/0280952 A1* | 9/2014 | Shear | ...................... | H04L 47/70 |
| | | | | 709/226 |
| 2016/0034305 A1* | 2/2016 | Shear | .................... | G06F 16/248 |
| | | | | 707/722 |
| 2017/0006135 A1* | 1/2017 | Siebel | ..................... | G06N 20/00 |
| 2017/0063882 A1* | 3/2017 | Be'Ery | ............... | H04W 56/001 |
| 2021/0319894 A1* | 10/2021 | Sobol | ..................... | G16H 40/67 |
| 2022/0026920 A1* | 1/2022 | Ebrahimi Afrouzi | ........................ | |
| | | | | G05D 1/0044 |
| 2022/0187841 A1* | 6/2022 | Ebrahimi Afrouzi | ........................ | |
| | | | | G05D 1/0274 |

* cited by examiner

| Service | Hypothesis | Outbound call |
|---|---|---|
| A | Start +10 | AB₁ |
| A | Start +20 | AC₁ |
| A | Start + 140 | End |
| A | BA₁ +80 | End |
| A | CA₁ +10 | End |
| B | AB₁ +30 | BA₁ |
| C | AC₁ +20 | CD₁ |
| C | AC₁ +90 | CA₁ |
| C | DC₁ +20 | CA₁ |
| D | CD₁ +30 | DC₁ |

320

| Service | Hypothesis | Outbound call |
|---|---|---|
| A | Start +10 | AB₁ |
| A | Start +70 | AB₂ |
| A | BA₁ +10 | AB₂ |
| A | Start +20 | AC₁ |
| A | Start + 140 | End |
| A | BA₁ +80 | End |
| A | BA₂ +20 | End |
| A | CA₁ +10 | End |
| B | AB₁ +30 | BA₁ |
| B | AB₁ +90 | BA₂ |
| B | AB₂ +30 | BA₂ |
| C | AC₁ +20 | CD₁ |
| C | AC₁ +90 | CA₁ |
| C | DC₁ +20 | CA₁ |
| D | CD₁ +30 | DC₁ |

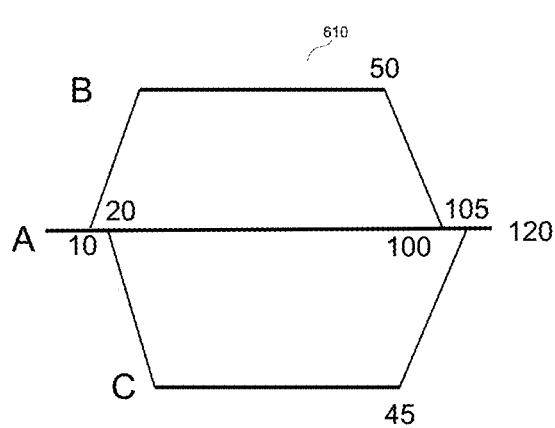
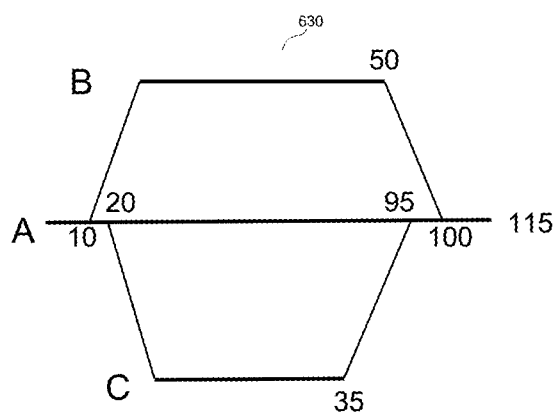
FIG. 6

800

810:

| Call | Trigger | Time A | Time B | Time C | Time D | | Connection | Latency |
|---|---|---|---|---|---|---|---|---|
| Start | | 0 | | | | | AB / BA | 2510 |
| AB1 | | 10 | 0 | | | | AC / CA | 10 |
| BA1 | | 5060 | 30 | | | | CD / DC | 10 |
| AB2 | | 5070 | 5060 | | | | | |
| BA2 | | 10120 | 5090 | | | | | |
| AC1 | | 20 | | 0 | | | | |
| CA1 | | 130 | | 90 | | | | |
| CD1 | | | | 20 | 0 | | | |
| DC1 | | | | 70 | 30 | | | |
| End | | 10140 | | | | | | |

820:

| Call | Trigger | Time A | Time B | Time C | Time D | Confirm | Invalidate | |
|---|---|---|---|---|---|---|---|---|
| AB1 | Start +10 | 10 | | | | FALSE | FALSE | |
| AB2 | Start +70 | 70 | | | | FALSE | TRUE | |
| AB2 | BA1 + 10 | 5070 | | | | FALSE | FALSE | |
| AC1 | Start +20 | 20 | | | | FALSE | FALSE | |
| End | Start +140 | 140 | | | | FALSE | TRUE | |
| End | BA1 +80 | 5140 | | | | FALSE | TRUE | |
| End | BA2 +20 | 10140 | | | | TRUE | FALSE | |
| End | CA1 +10 | 140 | | | | FALSE | TRUE | |
| BA1 | AB1 +30 | | 30 | | | FALSE | FALSE | |
| BA2 | AB1 +90 | | 90 | | | FALSE | TRUE | |
| BA2 | AB2 +30 | | 5090 | | | TRUE | FALSE | |
| CD1 | AC1 +20 | | | 20 | | FALSE | FALSE | |
| CA1 | AC1 +90 | | | 90 | | FALSE | FALSE | |
| CA1 | DC1 +20 | | | 90 | | FALSE | FALSE | |
| DC1 | CD1 +30 | | | | 30 | FALSE | FALSE | |

| Call | Trigger | Time A | Time B | Time C | Time D | | Connection | Latency |
|---|---|---|---|---|---|---|---|---|
| Start | | 0 | | | | | AB / BA | 10 |
| AB1 | | 10 | 0 | | | | AC / CA | 10 |
| BA1 | | 60 | 30 | | | | CD / DC | 10 |
| AB2 | | 70 | 60 | | | | | |
| BA2 | | 120 | 90 | | | | | |
| AC1 | | 20 | | 0 | | | | |
| CA1 | | 130 | | 90 | | | | |
| CD1 | | | | 20 | 0 | | | |
| DC1 | | | | 70 | 30 | | | |
| End | | 140 | | | | | | |
| | | | | | | | | |
| | | | | | | | | |
| | | | | | | Confirmed | Invalidated | Verified |
| AB1 | Start +10 | 10 | | | | FALSE | FALSE | TRUE |
| AB2 | Start +70 | 70 | | | | FALSE | TRUE | FALSE |
| AB2 | BA1 + 10 | 70 | | | | FALSE | FALSE | TRUE |
| AC1 | Start +20 | 20 | | | | FALSE | FALSE | TRUE |
| End | Start +140 | 140 | | | | FALSE | TRUE | FALSE |
| End | BA1 +80 | 140 | | | | FALSE | TRUE | FALSE |
| End | BA2 +20 | 140 | | | | TRUE | TRUE | TRUE |
| End | CA1 +10 | 140 | | | | TRUE | TRUE | TRUE |
| BA1 | AB1 +30 | | 30 | | | FALSE | FALSE | TRUE |
| BA2 | AB1 +90 | | 90 | | | FALSE | TRUE | FALSE |
| BA2 | AB2 +30 | | 90 | | | TRUE | FALSE | TRUE |
| CD1 | AC1 +20 | | | 20 | | FALSE | FALSE | TRUE |
| CA1 | AC1 +90 | | | 90 | | FALSE | TRUE | FALSE |
| CA1 | DC1 +20 | | | 90 | | TRUE | FALSE | TRUE |
| DC1 | CD1 +30 | | | | 30 | FALSE | FALSE | TRUE |

| Call | Trigger | Time A | Time B | Time C | Time D | | Connection | Latency |
|---|---|---|---|---|---|---|---|---|
| Start | | 0 | | | | | AB / BA | 10 |
| AB1 | | 10 | 0 | | | | AC / CA | 2510 |
| BA1 | | 60 | 30 | | | | CD / DC | 10 |
| AB2 | | 70 | 60 | | | | | |
| BA2 | | 120 | 90 | | | | | |
| AC1 | | 20 | | 0 | | | | |
| CA1 | | 5130 | | 90 | | | | |
| CD1 | | | | 20 | 0 | | | |
| DC1 | | | | 70 | 30 | | | |
| End | | 5140 | | | | | | |
| | | | | | | | | |
| | | | | | | | | |
| | | | | | | | Confirm | Invalidate |
| AB1 | Start +10 | 10 | | | | | FALSE | FALSE |
| AB2 | Start +70 | 70 | | | | | FALSE | FALSE |
| AB2 | BA1 + 10 | 70 | | | | | FALSE | FALSE |
| AC1 | Start +20 | 20 | | | | | FALSE | FALSE |
| End | Start +140 | 140 | | | | | FALSE | TRUE |
| End | BA1 +80 | 140 | | | | | FALSE | TRUE |
| End | BA2 +20 | 140 | | | | | FALSE | TRUE |
| End | CA1 +10 | 5140 | | | | | TRUE | FALSE |
| BA1 | AB1 +30 | | 30 | | | | FALSE | FALSE |
| BA2 | AB1 +90 | | 90 | | | | FALSE | FALSE |
| BA2 | AB2 +30 | | 90 | | | | FALSE | FALSE |
| CD1 | AC1 +20 | | | 20 | | | FALSE | FALSE |
| CA1 | AC1 +90 | | | 90 | | | FALSE | FALSE |
| CA1 | DC1 +20 | | | 90 | | | FALSE | FALSE |
| DC1 | CD1 +30 | | | | 30 | | FALSE | FALSE |

| Call | Trigger | Time A | Time B | Time C | Time D | | Connection | Latency |
|---|---|---|---|---|---|---|---|---|
| Start | | 0 | | | | | AB / BA | 10 |
| AB1 | | 10 | 0 | | | | AC / CA | 10 |
| BA1 | | 60 | 30 | | | | CD / DC | 2510 |
| AB2 | | 70 | 60 | | | | | |
| BA2 | | 120 | 90 | | | | | |
| AC1 | | 20 | | 0 | | | | |
| CA1 | | 5130 | | 5090 | | | | |
| CD1 | | | | 20 | 0 | | | |
| DC1 | | | | 5070 | 30 | | | |
| End | | 5140 | | | | | | |
| | | | | | | | Confirm | Invalidate |
| AB1 | Start +10 | 10 | | | | | FALSE | FALSE |
| AB2 | Start +70 | 70 | | | | | FALSE | FALSE |
| AB2 | BA1 + 10 | 70 | | | | | FALSE | FALSE |
| AC1 | Start +20 | 20 | | | | | FALSE | FALSE |
| End | Start +140 | 140 | | | | | FALSE | TRUE |
| End | BA1 +80 | 140 | | | | | FALSE | TRUE |
| End | BA2 +20 | 140 | | | | | FALSE | TRUE |
| End | CA1 +10 | 5140 | | | | | TRUE | FALSE |
| BA1 | AB1 +30 | | 30 | | | | FALSE | FALSE |
| BA2 | AB1 +90 | | 90 | | | | FALSE | FALSE |
| BA2 | AB2 +30 | | 90 | | | | FALSE | FALSE |
| CD1 | AC1 +20 | | | 20 | | | FALSE | FALSE |
| CA1 | AC1 +90 | | | 90 | | | FALSE | TRUE |
| CA1 | DC1 +20 | | | 5090 | | | TRUE | FALSE |
| DC1 | CD1 +30 | | | | 30 | | FALSE | FALSE |

*FIG. 11*

LANDSCAPE SIMULATION SYSTEM

BACKGROUND

Modern organizations often utilize a system landscape consisting of computing services provided by a plurality of geographically-distant computing systems. For example, in order to achieve desired functionality, an organization may employ services executed by on-premise data centers (which themselves may be located in disparate geographic locations) and by data centers provided by one or more infrastructure as-a-service (IaaS) providers. The distance of these systems from one another introduces communication latencies which affect overall system performance, i.e., end user request response time.

In one common scenario, an organization may wish to move a service from an on-premise system to a cloud-based server. For example, if a service deployment is moved from a datacenter within a customer facility to an offsite IaaS provider connected via wide area network (WAN), the communication between this service deployment and a warehouse system also located at the customer facility will exhibit increased latency. Generally, moving a service from a first computing system to a second computing system affects overall system performance because the latencies between the second computing system and the other computing systems of the landscape differ from the latencies between the first computing system and the other computing systems of the landscape.

An organization may wish to re-locate a service in order to save cost, increase performance, and/or satisfy an operational requirement. In order to optimize the decision to re-locate the service, it is necessary to determine the extent to which moving the service will impact overall system performance. Simply locating the services in a manner resulting in a lowest total latency between services is not optimal, because some communication paths may be used more often than others, and some communication paths may impact overall performance more than others. Moreover, some services may be un-movable because they are, for example, tied to on-premise facilities (e.g., factory, warehouse, customer datacenter) or provided by a third party.

Additional considerations are presented by landscapes which provide high availability (HA) to certain availability zones (AZs) and disaster recovery. Such a landscape may comprise service deployments within an AZ and a disaster recovery setup in a remote datacenter. Failover of the service to the remote datacenter during disaster recovery can result in changing a former communication within the AZ to a considerably slower inter-AZ communication. This consequence requires consideration of which services should fail over together in one set if one of the services within this set fails, and which other service sets can remain unaffected in such a scenario. Ideally, the fail-over would include as few services as possible, but if the fail-over results in unacceptable latency to certain services, then those other services should fail over as well. The permutations of different service set combinations can quickly grow very large, so an efficient evaluation of different options with the given operational parameters is desired.

Previously, evaluation of landscape changes required creation and operation of a test landscape, including booking of IaaS resources, deploying of components, configuration of services, providing of test data, and application of a test workload. The performance of the test landscape would be measured and analyzed, the test landscape would be modified based on the analysis, and the process would repeat for any number of iterations until an acceptable landscape was determined.

It has been considered to estimate the impact of increased latency on a landscape using a tool (e.g., a "WAN emulator") which selectively delays service-to-service communication within a landscape. This approach allows injection of increased latency to simulate the moving of a first service away from another service but cannot be used to simulate latency between the first service and a third service which might actually decrease as a result of the move. Also, the use of such a tool within an existing production landscape may cause undesirable effects such as timeouts, increased error rates, or complete outages.

Since communication patterns within a service landscape are complex and difficult to assess and options for deployment are many-fold, it is difficult to design a landscape to achieve a particular performance level and even more difficult to understand the consequences of changing an already-deployed landscape. In a large landscape of services, theoretical planning of an optimal layout can be computationally overwhelming.

The introduction of new services into a new landscape presents an additional but related difficulty. If the new services communicate with existing services deployed in different locations, the locations of the new services must be considered with respect to the locations of the existing services. Such consideration is preferably based on data characterizing communication between all the services during deployment, which is not available since the new services have not yet been deployed.

Systems are desired for efficiently generating a model of a service landscape without requiring a parallel test landscape, and for using the model to simulate a change to a service-to-service latency and to evaluate overall landscape performance resulting from such a change.

BRIEF DESCRIPTION OF THE DRAWINGS

FIG. 5 illustrates comparison of hypotheses during call-map clustering according to some embodiments.

FIG. 6 illustrates comparison of hypotheses during call-map clustering according to some embodiments.

FIG. 8 is a table to illustrate evaluation of hypotheses according to some embodiments.

FIG. 9 is a table to illustrate evaluation of hypotheses according to some embodiments.

FIG. 10 is a table to illustrate evaluation of hypotheses according to some embodiments.

FIG. 11 is a table to illustrate evaluation of hypotheses according to some embodiments.

DETAILED DESCRIPTION

The following description is provided to enable any person in the art to make and use the described embodiments and sets forth the best mode contemplated for carrying out some embodiments. Various modifications, however, will be readily-apparent to those in the art.

Briefly, some embodiments provide a tool to monitor inter-service communication within a landscape of services, determine a model representing such communication, and use the model to simulate the effects of changes to the landscape which would change inter-service latency. Embodiments may therefore allow developers to analyze different service deployments significantly faster at considerably lower costs and with substantially lower risk than existing systems which require iterative deployment and measurement of proposed landscape changes.

Figure 1:
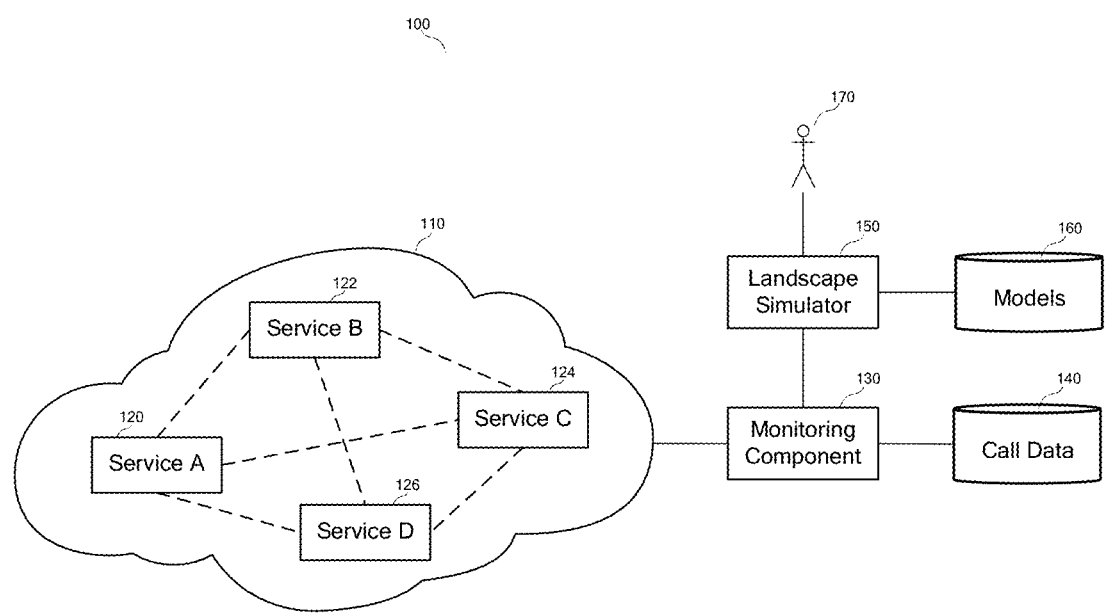
FIG. 1 is a block diagram of an architecture to model and simulate communications between a plurality of services according to some embodiments.

FIG. 1 is a block diagram of an architecture of system 100 according to some embodiments. Each illustrated element of system 100 may be implemented using any suitable combination of computing hardware and/or software that is or becomes known. Such a combination may include implementations which apportion computing resources elastically according to demand, need, price, and/or any other metric. In some embodiments, two or more elements of system 100 are implemented by a single computing device. Two or more elements of system 100 may be co-located. One or more elements of system 100 may be implemented as a cloud service (e.g., Software-as-a-Service, Platform-as-a-Service).

Service landscape 110 may comprise any combination of computing systems interconnected in any known manner. In the illustrated example, the computing systems provide services 120 through 126. The computing systems providing services 120 through 126 may be located remotely from one another, and a single computing system may provide more than one of services 120 through 126. For purposes of the description herein, The "location" of a service refers to the location of the computing system which executes program code to provide such services. The computing system may comprise an on-premise server, a cloud-deployed virtual machine, or any other suitable computing system to provide a software-based service.

Service landscape 110 is depicted as a cloud in order to represent communication between services 120 through 126 according to Web communication protocols, but embodiments are not limited thereto. Although each of services 120 through 126 is depicted as communicating with each other one of services 120 through 126, embodiments are not limited thereto.

Monitoring component 130 monitors service-to-service communications within landscape 110. For example, for each call made from one service to another, monitoring component 130 may acquire and store call data 140 describing the calling service, the called service, the time at which the call was made by the calling service (according to the clock of the calling service), the time at which the call was received by the called service (according to the clock of the called service), and a task identifier.

The task identifier identifies all service-to-service calls which were made as a result of an initial request. For example, an end-user may operate a Web browser to request an action from a first service. In order to fulfill the request, the first service may call a second service, receive a result from the second service, call a third service, and receive a result from the third service. The second service may call a fourth service and receive a result therefrom in order to respond to the call received from the first service. The first service then returns a result to the end user after inter-service calls have been completed. All of these inter-service calls are associated with the same unique task identifier.

The task identifier allows grouping of related calls and thereby facilitates modelling of the operation of the service landscape. For example, a task which updates contact information may involve a particular pattern of service-to-service calls, while a task which generates a purchase order may involve a different pattern of service-to-service calls. The task identifier allows identification of calls which were made to update contact information and identification of calls which were made to generate a purchase order, even if several of the same services were called during execution of each of these tasks. This task-specific identification allows modeling of the service-to-service communication within landscape 110 on a task-specific basis.

In addition to the above-described monitoring, monitoring component 130 may instruct landscape 110 to selectively introduce additional latency into particular service-to-service communications. As will be described below, this latency may be introduced in order to evaluate and determine models for each task performed during operation of landscape 110. Monitoring component 130 may comprise any system executing program code to provide the functions described herein. Monitoring component 130 may communicate with a control plane of landscape 110 in order to acquire call data 140 and control the latencies as described herein. In some embodiments, the control plane comprises sidecars of a service mesh as is known in the art.

As will be described in detail below, landscape simulator 150 generates hypotheses based on call data 140, evaluates the hypotheses by instructing monitoring component 130 to change particular service-to-service latencies within landscape 110 and to monitor resulting call data, and creates models 160 based on the evaluation. Moreover, user 170 may operate landscape simulator 150 to determine, based on models 160, the effect which changing a location of one or more of services 120 through 126 would have on the performance of landscape 110.

Landscape simulator 150 may also comprise any system executing program code. In some embodiments, monitoring component 130 and landscape simulator 150 comprise the same or different applications executing on a same computing system.

Figure 2A:
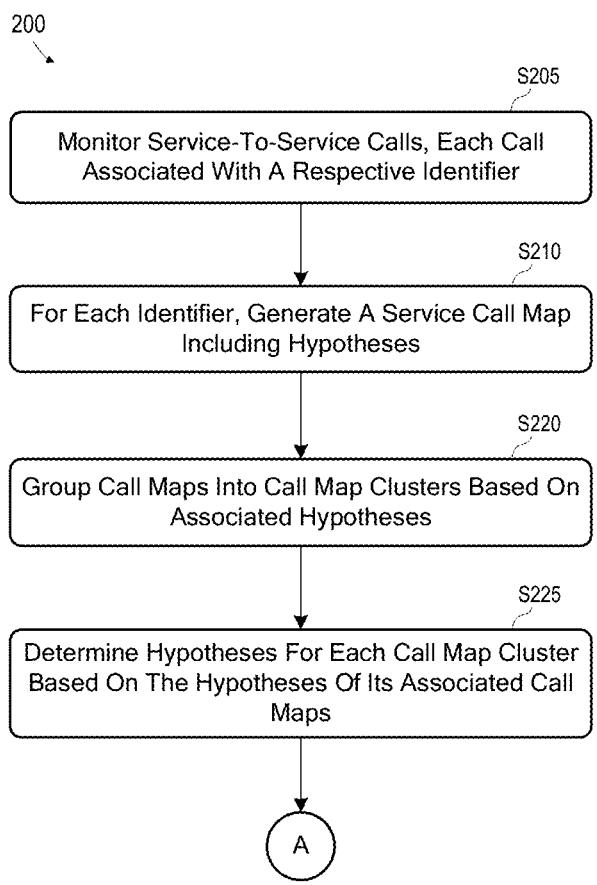
FIGS. 2A and 2B comprise a flow diagram of a process to model communications between a plurality of services according to some embodiments.
Figure 2B:
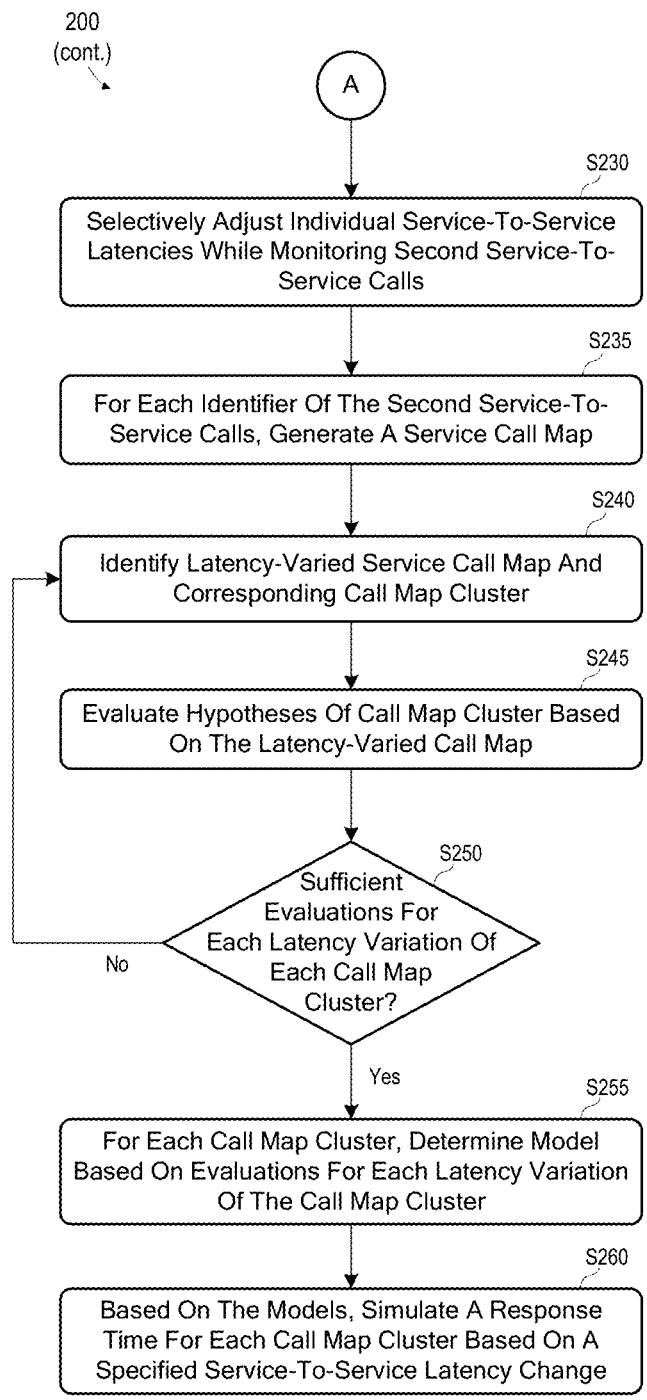

FIGS. 2A and 2B comprise a flow diagram of process 200 to provide landscape modelling and simulation according to some embodiments. Process 200 and all other processes mentioned herein may be embodied in program code executable by one or more processing units (e.g., processor, processor core, processor thread) and read from one or more of non-transitory computer-readable media, such as a hard disk drive, a volatile or non-volatile random access memory, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S205, service-to-service calls within a service landscape are monitored. The monitoring at S205 may comprise monitoring of telemetry data and is intended to capture relevant aspects of service-to-service communication patterns during normal productive operation of the service landscape, with such patterns including call dependencies between services. Monitoring at S205 may proceed for any length of time that is deemed suitable to obtain an amount of call data from which a suitable model may be generated.

As described above, each monitored service call is associated with a task identifier which identifies an external call which spawned the service call. With reference to FIG. 1, monitoring component 130 may execute S205 and may store the resulting call data in call data 140.

Figure 3:
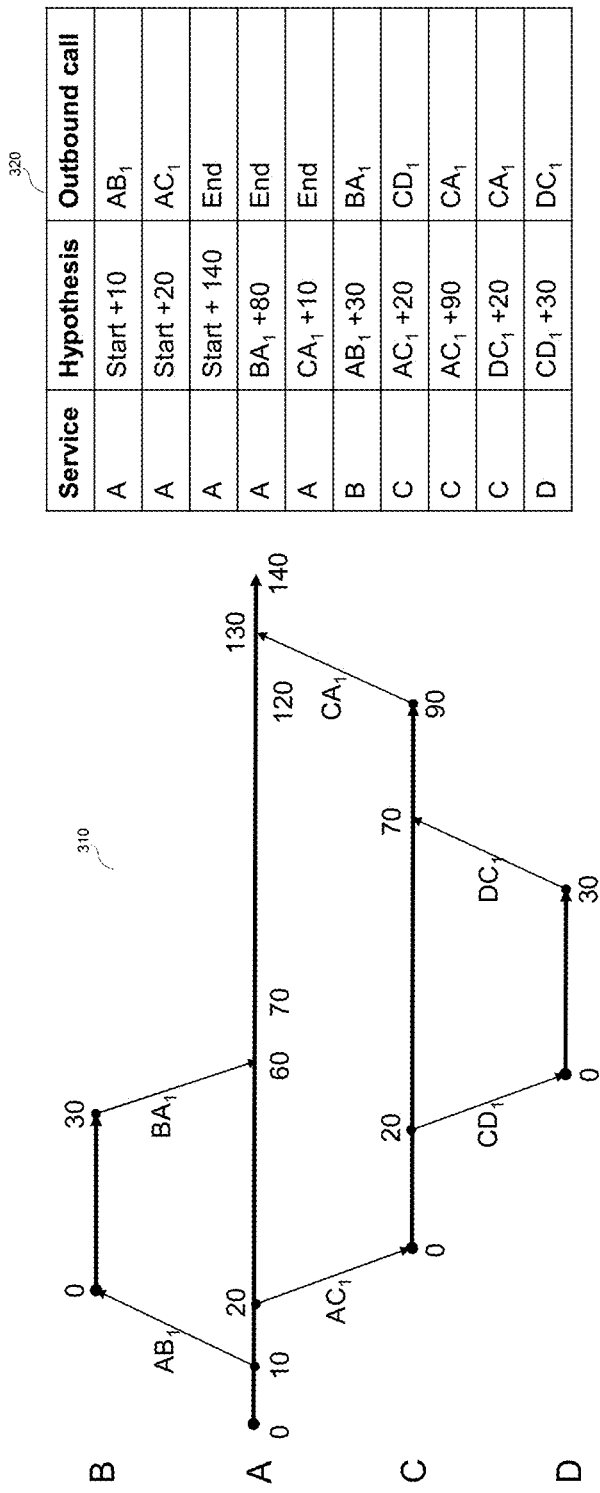
FIG. 3 illustrates a call map and associated hypotheses according to some embodiments.

A service call map including hypotheses is generated for each identifier at S210. For example, landscape simulator 150 may identify all calls associated with a same identifier and generate hypotheses based thereon. The hypotheses represent dependencies of each outbound call relative to earlier inbound calls and a runtime delay between these two events. FIG. 3 is an example of a call map including hypotheses generated at S210 according to some embodiments.

Diagram 310 illustrates all service-to-service calls resulting from an initial external call to service A, and therefore associated with a same task identifier. As shown, service A calls service B (i.e., via service call $AB_1$) 10 ms after receiving the initial external call. 30 ms after service B has been called, service B calls service A (i.e., call $BA_1$). Similarly, service A calls service C (i.e., call $AC_1$) 20 ms after receiving the initial external call and service C calls service D (i.e., call $CD_1$) 20 ms after receiving call $AC_1$.

Call map 320 illustrates hypotheses generated based on the calls shown in diagram 310. For each outbound call issued by a service, each inbound call received by the service prior to the outbound call creates one hypothesis. For example, if three inbound calls are received before a first outbound call is issued and then another inbound call is received before a second outbound call is issued, then seven hypotheses are generated (i.e., three for the first outbound call and four for the second outbound call).

With respect to call map 320, the first outbound call of service A ($AB_1$) is preceded by the initial inbound call (annotated as "Start"). Since outbound call $AB_1$ is received 10 ms after Start, the first hypothesis of call map 320 is "Start+10 ms", associated with outbound call $AB_1$. Similarly, the hypothesis associated with outbound call $AC_1$ and the initial inbound call start is "Start+20".

The hypotheses of call map 320 also represent service-to-service calls. For example, outbound call $BA_1$ of service B occurs 30 ms after inbound call $AB_1$. The associated hypothesis of call map 320 is "$AB_1$+30". Similarly, outbound call $CA_1$ of service C occurs 90 ms after inbound call $AC_1$ and 20 ms after inbound call $DC_1$. Accordingly, call map 320 includes two hypotheses associated with outbound call $CA_1$, "$AC_1$+90" and "$DC_1$+20".

The final response to the user, denoted at time 140 of service A in diagram 310, is handled similarly to all other outbound calls. That is, a hypothesis is generated for each inbound call to service A (including the original external call Start) which precedes the final response (denoted as "End"). Call map 320 depicts these hypotheses as "Start+140", $BA_1$+80" and "$CA_1$+10".

Considering diagram 310, if the latency of communication between services A and B increases (e.g., because service B has been moved to a different region), the processing time required by service B for the particular task will likely not change. However, due to the increased latency, inbound call $BA_1$ will arrive at service A later than shown in diagram 310. If the "End" outbound call depends on $BA_1$ (i.e., if hypothesis $BA_1$+80 is valid), the response time for responding to the external call will therefore be impacted if service B is moved. If the "End" outbound call does not depend on $BA_1$ (i.e., if hypothesis $BA_1$+80 is invalid), moving service B will not impact response time.

Figure 4:
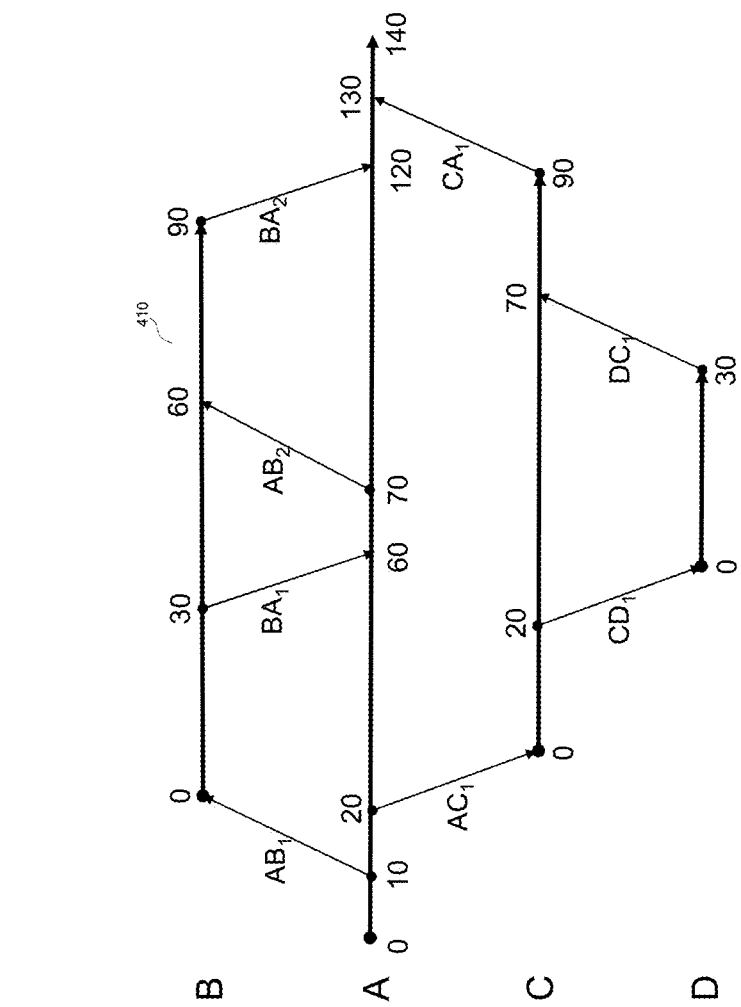
FIG. 4 illustrates a call map and associated hypotheses according to some embodiments.

FIG. 4 is another example of a call map including hypotheses generated at S210 according to some embodiments. Again, and based on call data monitored at S205, diagram 410 illustrates all service-to-service calls resulting from an initial external call to service A (i.e., associated with a same task identifier). Service A calls service B (i.e., via service call $AB_1$) 10 ms after receiving the initial external call and, 30 ms after service B has been called, service B calls service A (i.e., call $BA_1$). Service A also calls service B (i.e., via service call $AB_2$) 10 ms after receiving inbound call $BA_1$ and, 50 ms after calling service B, service A receives call $BA_2$. Service A calls service C (i.e., call $AC_1$) 20 ms after receiving the initial external call and service C calls service D (i.e., call $CD_1$) 20 ms after receiving call $AC_1$. As in FIG. 3, call map 420 illustrates hypotheses generated based on the calls shown in diagram 410.

Returning to process 200, the call maps generated at S210 are grouped into call map clusters based on their associated hypotheses. Each call map cluster is intended to include all call maps associated with a particular type of external request. For example, all call maps which are based on service-to-service calls resulting from a request to update contact information may be grouped into a single call map cluster at S220.

According to some embodiments, the grouping at S220 is based on the hypotheses associated with each call map. Generally, two call maps are grouped into a same cluster if their associated hypotheses are substantially equivalent. Two hypotheses may be considered equivalent in some embodiments if they are relative to the same inbound call and the difference between their specified time delays is below a certain threshold. For example, the hypotheses "$AB_1$+30" associated with outbound call $BA_1$ of call map 320 and outbound call $BA_1$ of call map 420 are considered equivalent, and may also be considered equivalent if the hypothesis associated with outbound call $BA_1$ of call map 420 was "$AB_1$+32". The use of a threshold compensates for variations in performance which may occur due to fluctuating runtime factors such as server load.

FIG. 5 illustrates call maps 420 and 320 of FIGS. 4 and 3, respectively. Hypotheses 422 and 424 of call map 420 have no equivalent hypotheses in call map 320. Accordingly, call maps 420 and 320 may be grouped into different call map clusters. In some embodiments, two call maps are regarded equivalent even if a hypothesis associated with an outbound call in one call map has no equivalent hypothesis in the other call map, as long as the time delay of this hypothesis is smaller than the threshold and the two call maps include at least one other equivalent hypothesis for the same outbound call.

FIG. 6 shows call diagrams 610 and 630 along with associated call maps 620 and 640. In diagram 610, inbound call $CA_1$ arrives at service A after inbound call $BA_1$ arrives at service A. In contrast, diagram 630 shows inbound call $CA_1$ arriving at service A before inbound call $BA_1$ arrives at service A. Nevertheless, according to some embodiments, call maps 620 and 640 are determined to belong to a same call map cluster at S220.

Call maps 620 and 640 may be determined to belong to a same call map cluster because each hypothesis and associated outbound call of call map 620 corresponds to one hypothesis and associated outbound call of call map 640. Additionally, the differences between the time delays of hypotheses 622, 624 and 626 and the time delays of corresponding hypotheses 642, 644 and 646 are within an acceptable threshold.

In some embodiments, the number of call maps grouped into a single call map cluster is recorded. This number allows computation of a relative frequency of execution of the sequence of calls corresponding to each call map cluster. The relative frequency may be used, as will be described below, to evaluate the overall effect of a latency change within the service landscape. For example, if a latency change significantly increases the total execution time of a sequence of calls of a particular call map cluster, but this sequence of calls is executed rarely (e.g., 2% of all call sequence executions), then the latency change may be considered acceptable. On the other hand, if a latency change mildly increases the total execution time of a sequence of calls of a particular call map cluster, but the sequence of calls is executed often (e.g., 85% of all call sequence executions), then the latency change may be considered unacceptable.

At S225, hypotheses are determined for each call map cluster based on the hypotheses of each call map of the call map cluster. For example, the time delay of each hypothesis of the call map cluster may be the average of the time delays in each call map for that hypothesis. With reference to FIG. 6, hypotheses determined for a call map cluster including only call maps 620 and 640 may include "Start+117.5" (based on hypotheses 622 and 642), "$CA_1$+20" (based on hypotheses 624 and 644), "$AC_1$+40" (based on hypotheses 626 and 646).

Next, at S230, individual service-to-service latencies are adjusted while monitoring service-to-service calls within the service landscape as previously described. In some embodiments, landscape simulator 150 instructs monitoring component 130 to increase the latency of communication between two services within the productively running landscape 110 and to store resulting call data. This process then repeats for each other service-to-service communication path, where the latency is increased for only one service-to-service communication path at any given time. In some embodiments, the latency is adjusted for only a small percentage of tasks (e.g., for 1 out of every 20 received external calls). This allows for minimal overall impact on end users who are using the productive landscape.

As described above, each service call monitored at S230 is associated with a task identifier which identifies an external call which spawned the service call. A service call map including hypotheses is generated for each identifier of the service-to-service calls monitored at S235 as described above with respect to S210. The hypotheses of each call map specify dependencies of each outbound call of the call map relative to earlier inbound calls and a runtime delay between the inbound and outbound calls.

The call maps generated at S235 may include many call maps reflecting no artificial latency adjustments because latency variations are applied to only a subset of tasks. Accordingly, a latency-varied service call map and its corresponding call map cluster are identified at S240. S240 may comprise calculating the expected outbound call timings of each call map cluster in view of each latency increase used at S230 and comparing the resulting timings with a generated call map to determine an associated call map cluster and the associated service-to-service latency increase (e.g., within a specified tolerance). For example, a call map may be identified as reflecting the call map cluster described above with respect to FIG. 6, but with a 300 ms latency between services A and C.

Figure 7:
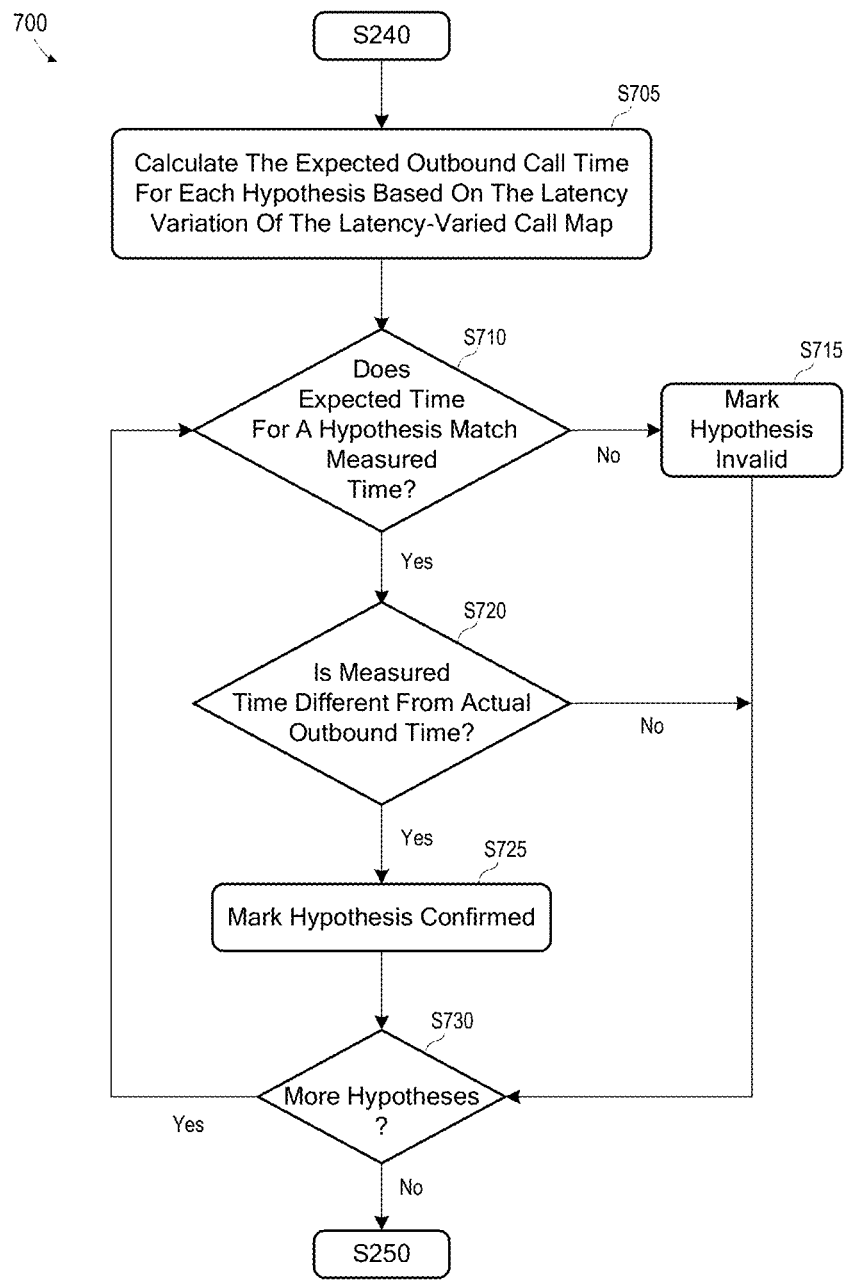
FIG. 7 is a flow diagram of a process to evaluate hypotheses according to some embodiments.

Next, at S245, the hypotheses of the corresponding call map cluster are evaluated based on the identified latency-varied call map. FIG. 7 is a flowchart of process 700 to evaluate hypotheses of a call map cluster at S245 according to some embodiments. Process 700 may be executed by landscape simulator 150 according to some embodiments.

At S705, the expected outbound call time for each hypothesis of the call map cluster determined at S240 is calculated based on the latency variation associated with the latency-varied call map identified at S240. Referring to the above example, the expected outbound call time for each hypothesis of the FIG. 6 call map cluster is calculated, assuming a 300 ms latency between services A and C.

FIG. 8 shows table 800 illustrating calculation of the expected outbound call time for each hypothesis of a call map cluster having the same hypotheses as call map 420, assuming a 2500 ms latency increase (i.e., from 10 ms to 2510 ms) between services A and B. Rows 810 include call data associated with the latency-varied call map identified at S240. For each service A, B, C and D, the corresponding columns of rows 810 indicate when, in the time of the associated service, a corresponding call of the Call column was received at the service or transmitted by the service.

Rows 820 depict, for each outbound call listed in the Call column, when the call is expected to have been transmitted, in the time of transmitting service, based on the corresponding hypothesis and the latency variation associated with the identified latency-varied call map. For example, a 2500 ms latency increase between services A and B would not affect the transmission time of call $AB_1$ from service A according to the hypothesis "Start+10". However, with respect to outbound call $AB_2$, the hypothesis "$BA_1$+10" results in adding 5000 ms to the non-latency-varied outbound call time (i.e., 70 ms) to compensate for the increased latency of call $AB_1$ and $BA_1$.

At S710, it is determined whether the calculated expected outbound call time for a hypothesis is substantially equal to (i.e., within a reasonable threshold of) the actually-measured time. For example, the expected time calculated for transmission of call $AB_2$ from service A based on the hypothesis "Start+70" is 70 but the actual time at which call $AB_2$ was transmitted from service A (per rows 810) was 5070. This hypothesis is marked as invalid at S715. Marking of the hypothesis as invalid according to some embodiments comprises setting an associated Invalidate flag to TRUE and an associated Confirm flag to FALSE. Flow continues to S730 to determine whether any more hypotheses remain for evaluation. If so, flow returns to S710 to evaluate a next hypothesis.

Flow proceeds from S710 to S720 if the calculated expected outbound call time for the next hypothesis matches the actually-measured time. The expected time calculated for transmission of call $AB_2$ from service A based on the hypothesis "BA$_1$+10" is 5070, which matches the actual time at which call AB$_2$ was transmitted from service A per rows 810. Accordingly, flow proceeds to S720.

At S720, it is determined whether the measured time is different from the actual non-latency-varied time of the outbound call. Table 900 of FIG. 9 shows the measured times of each outbound call of the present call map cluster as measured during normal (i.e., non-latency varied) operation. As shown, the actual non-latency-varied time of outbound call AB$_2$ is 70, which differs from the latency-varied measured time of 5070. Flow therefore proceeds to S725 to mark the hypothesis as confirmed. Marking of the hypothesis as confirmed according to some embodiments comprises setting an associated Invalidate flag to FALSE and an associated Confirm flag to TRUE.

If it is determined at S720 that the measured time is not different from the actual non-latency-varied time of the outbound call, flow simply proceeds to S730 to determine whether any more hypotheses remain for evaluation. In such a case, the Invalidate and Confirm flags associated with the hypothesis are both set to FALSE to indicate that the hypothesis is neither invalidated nor confirmed by the latency-varied call map. Flow continues as described above until it is determined at S730 that no more hypotheses of the call map cluster remain to be evaluated.

Next, returning to S250 of process 200, it is determined whether a sufficient number of evaluations have been performed for each latency variation of each call map cluster. In this regard, it is desirable to evaluate, for each call map cluster identified at S220, at least one latency-varied call map for each of the potential latency variations of the call map cluster. With respect to the call map cluster represented by table 900, it is desired to identify and evaluate at least one latency-varied call map corresponding to the call map cluster and associated with an increased latency between services A and B (as described above and illustrated in table 800), at least one latency-varied call map corresponding to the call map cluster and associated with an increased latency between services A and C, and at least one latency-varied call map corresponding to the call map cluster and associated with an increased latency between services C and D.

Table 1000 of FIG. 10 illustrates expected and measured values associated with a latency-varied call map representing an increased latency between services A and C, and table 1100 of FIG. 11 illustrates expected and measured values associated with a latency-varied call map representing an increased latency between services C and D. These expected and measured values are evaluated as described above with respect to tables 800 and 900 to confirm or invalidate the hypotheses of the call map cluster.

Since, according to the hypotheses of the call map cluster, services B and D do not communicate with each other, services B and C do not communicate with each other, and services A and D do not communicate with each other, changes to the latencies of any of these communication paths will not affect the sequence of calls of the call map cluster. Accordingly, evaluation of latency-varied call maps associated with these communication paths is not needed.

Flow cycles between S240 and S250 as described above until a sufficient number of evaluations has been performed for each latency variation of each call map cluster. Next, at S255, a model is determined for each call map cluster based on the evaluations of each latency variation of the call map cluster. A model for a call map cluster is determined based on the values of the Confirmed and Invalidated flags associated with each hypothesis of the call map cluster, for each latency variation. For example, the model for the call map cluster of table 900 is determined based on the values of the Confirmed and Invalidated flags associated with each hypothesis shown in tables 800, 1000 and 1100.

In some embodiments, and as reflected in Verified column of table 900, hypotheses that have been assigned a TRUE Confirmed flag by at least one latency-varied call map evaluation are regarded as verified (i.e., Verified=TRUE). Hypotheses that were not assigned a TRUE Confirmed flag by at least one latency-varied call map evaluation nor a TRUE Invalidated flag by at least one latency-varied call map evaluation are also regarded as verified. All other hypotheses are regarded as not verified (i.e., Verified=FALSE). The determined model comprises the set of all verified hypotheses.

Figure 12:
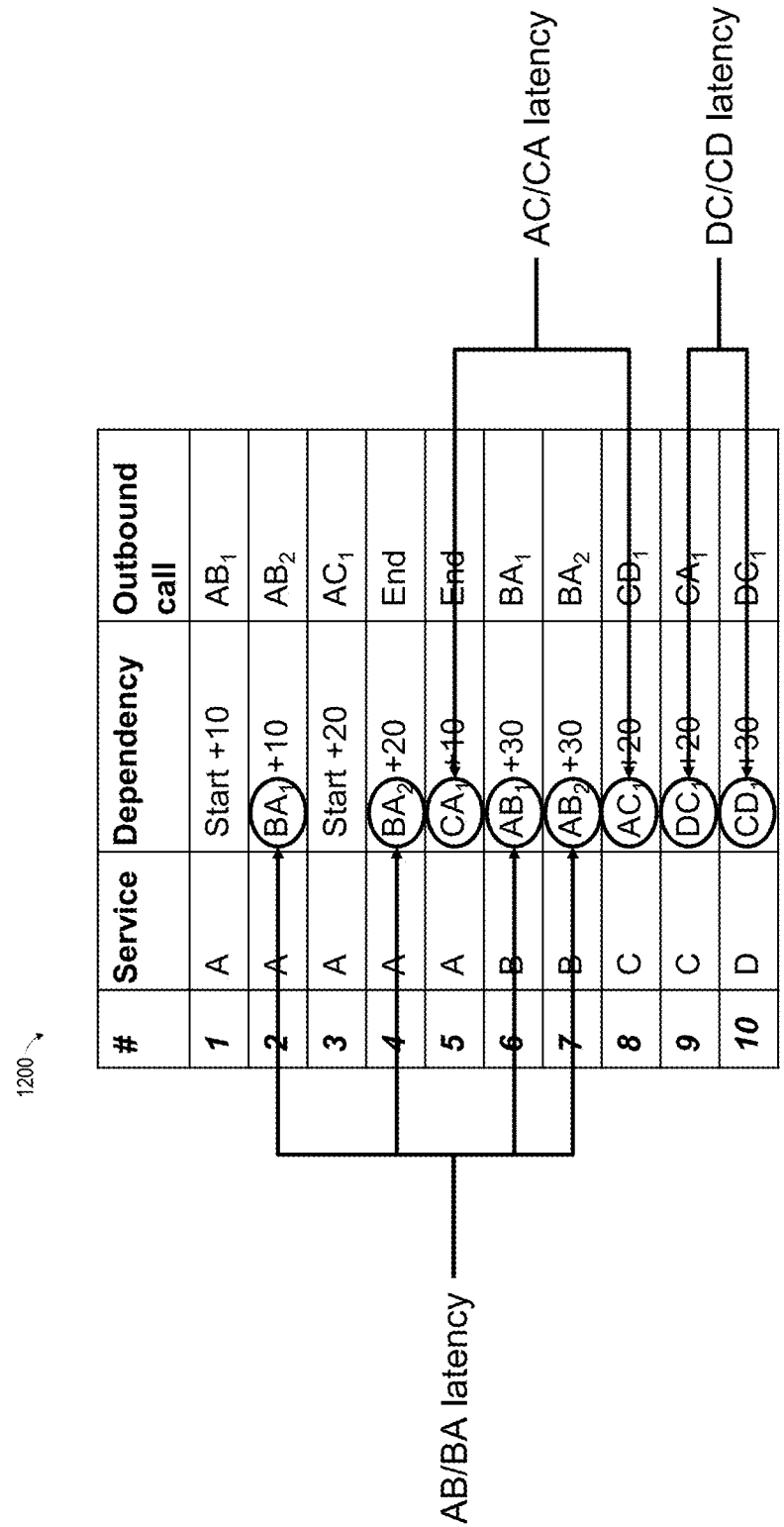
FIG. 12 is a table to illustrate confirmed hypotheses of a model associated with a call map cluster determined according to some embodiments.
Figure 13:
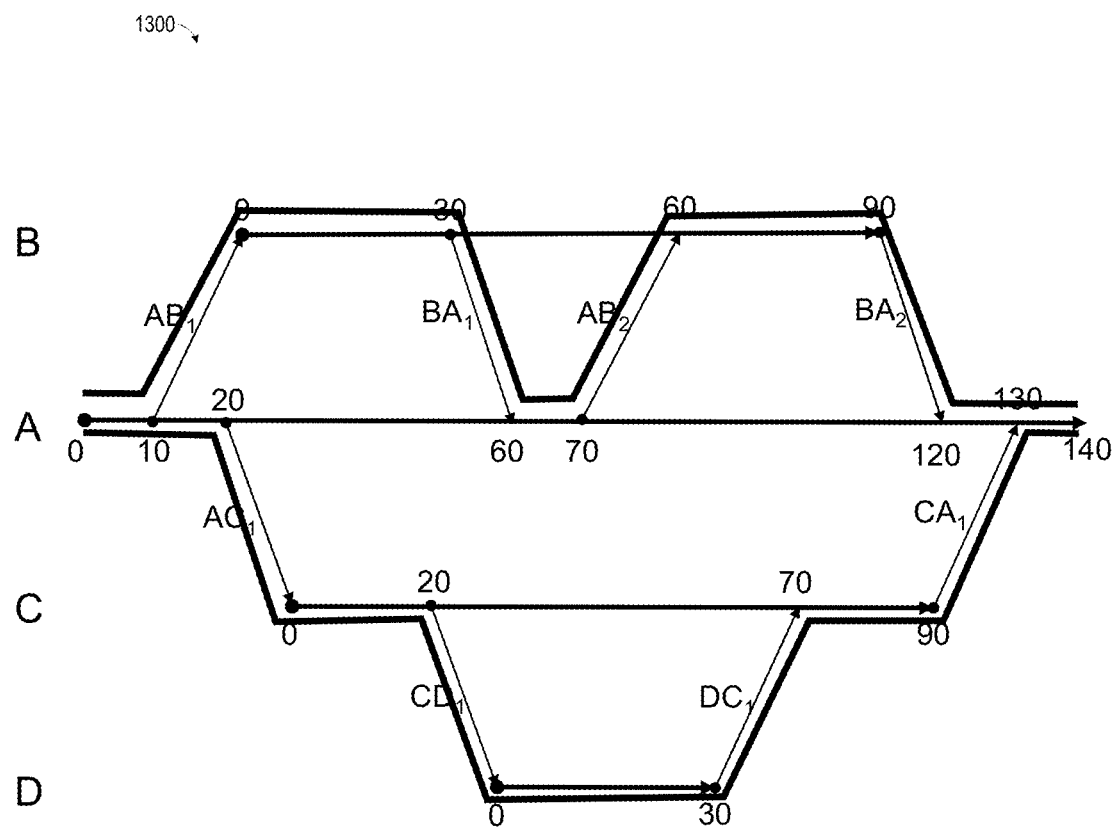
FIG. 13 depicts a call map reflecting confirmed hypotheses of an associated model according to some embodiments.

FIG. 12 illustrates the verified hypotheses of model 1200 associated with the call map cluster of table 900. FIG. 12 also indicates the hypotheses associated with outbound calls which will be affected by particular service-to-service latencies. In another representation, FIG. 13 shows call diagram 1300 depicting the same verified hypotheses of the call map cluster using bold lines.

Based on the determined models, a response time may be simulated for each call map cluster at S260 assuming one or more specified service-to-service latency changes. For example, the specified service-to-service latency changes may represent migration of a service from an on-premise datacenter to a cloud-based availability zone of a cloud provider. Referring to the model of FIGS. 12 and 13, movement of service A may change the latency of the service A-to-service B communication path as well as the latency of the service A-to-service C communication path. Movement of service D, in contrast, may only change the latency of the service C-to-service D communication path.

Referring to model 1200, the effect of increasing the latency of the service A-to-service B communication path to 500 ms may be determined by tracing the hypotheses associated with this communication path until the outbound call End. Referring to hypothesis #1, outbound call AB$_1$ occurs 10 ms after the external call is received. Outbound call AB$_1$ takes 500 ms to reach service B and then, referring to hypothesis #6, outbound call BA$_1$ occurs 10 ms after call AB$_1$ is received, or 520 ms from reception of the original external call.

Outbound call BA$_1$ takes 500 ms to reach service A, and outbound call AB$_2$ occurs 10 ms after call BA$_1$ is received at service A (or 1030 ms from reception of the external call), per hypothesis #2. Outbound call AB$_2$ takes 500 ms to reach service B and, referring to hypothesis #7, outbound call BA$_2$ occurs 30 ms after call AB$_2$ is received, or 1560 ms from reception of the external call. Outbound call BA$_2$ takes 500 ms to reach service A, which then issues the final call (i.e., End) 20 ms after receiving call BA$_2$, per hypothesis #4. Accordingly, the overall response time associated with the call map cluster represented by model 1200 in the case of a 500 ms latency between service A and service B is 2080 ms.

By determining the response time for each call map cluster in view of a proposed latency change, it is possible to determine a maximum response time which will result from the latency change. Also, using the relative frequency with which the call sequences associated with each call map cluster are executed, it is possible to determine an overall effect (i.e., change to overall net response time) caused by the latency change. For example, if a latency change would result in a large change to the response time of a first call map cluster and small changes to the response times of other call map clusters, but the first call map cluster represents only 2% of all executed call sequences, it may be determined that the latency change is acceptable.

Figure 14:
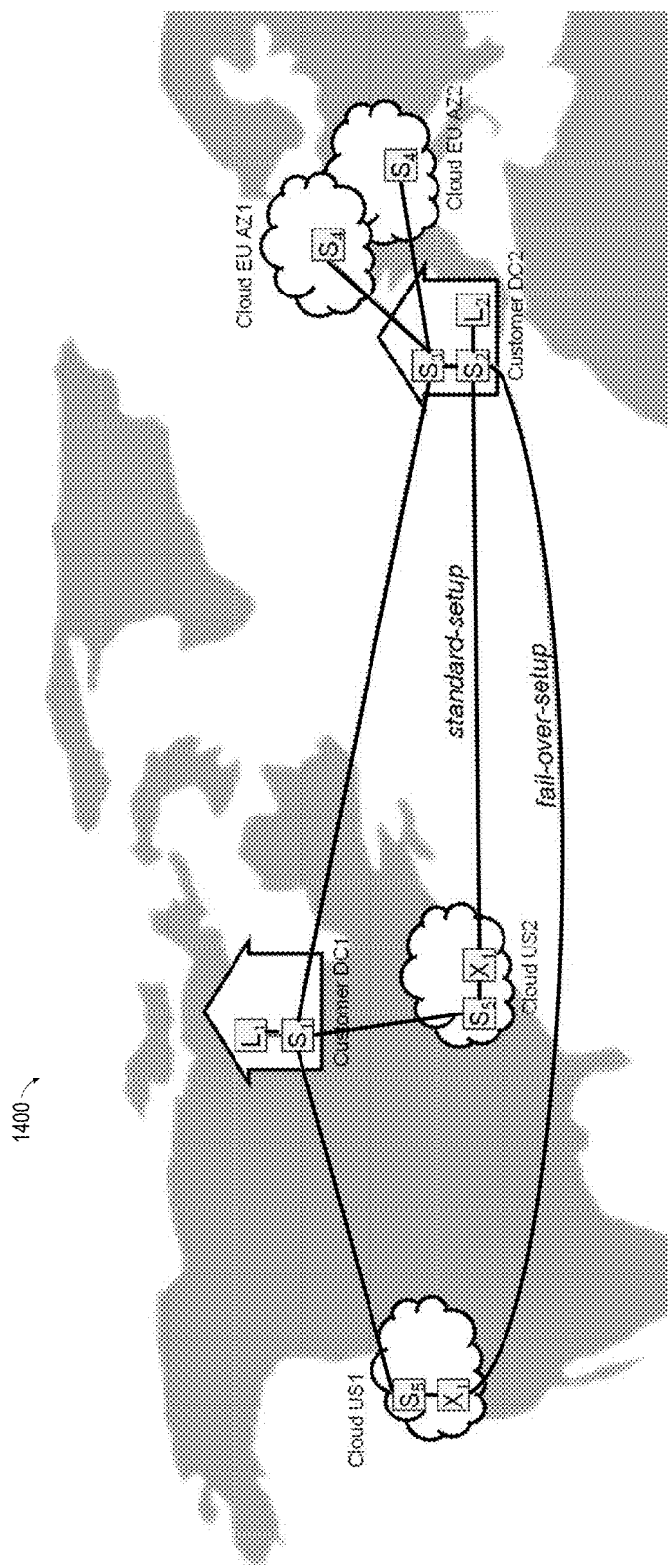
FIG. 14 illustrates geographical locations of deployed services within a computing landscape according to some embodiments.
Figure 15:
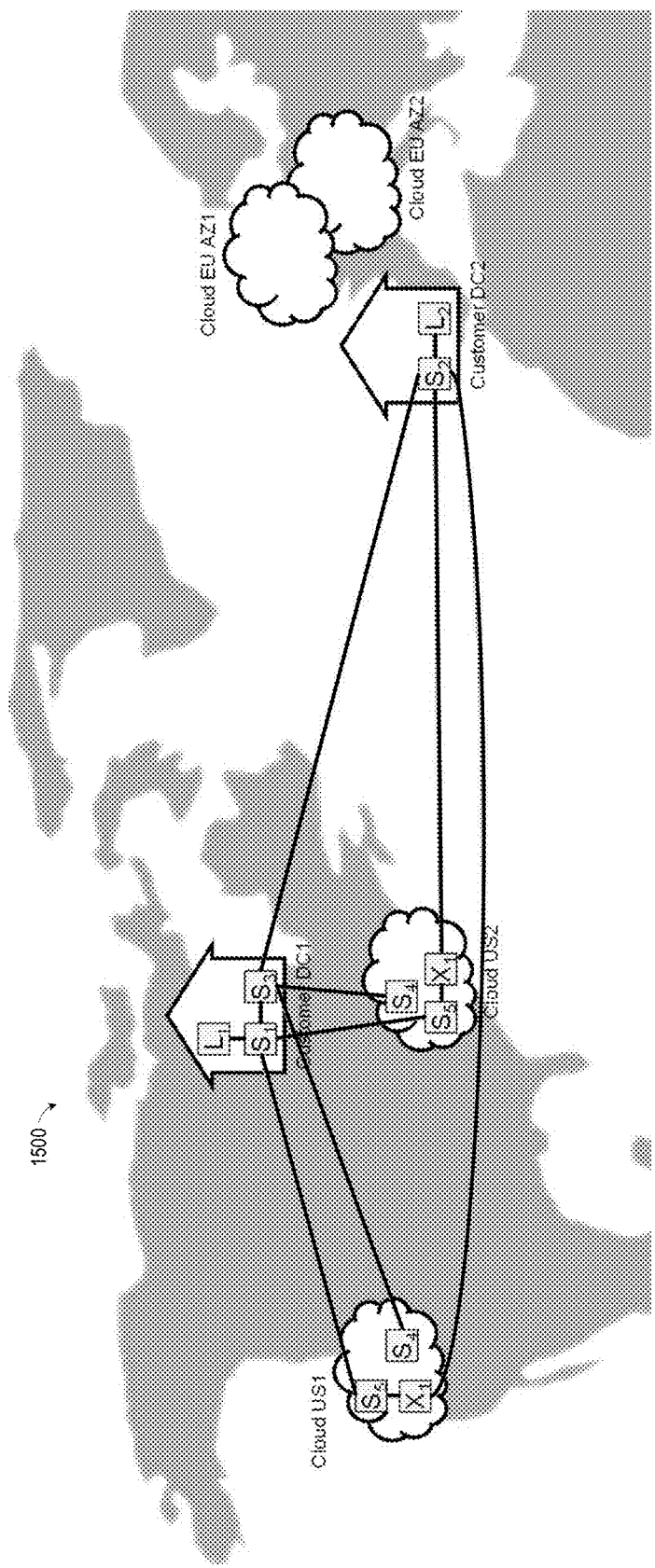
FIG. 15 illustrates geographical locations of deployed services within a proposed computing landscape according to some embodiments.
Figure 16:
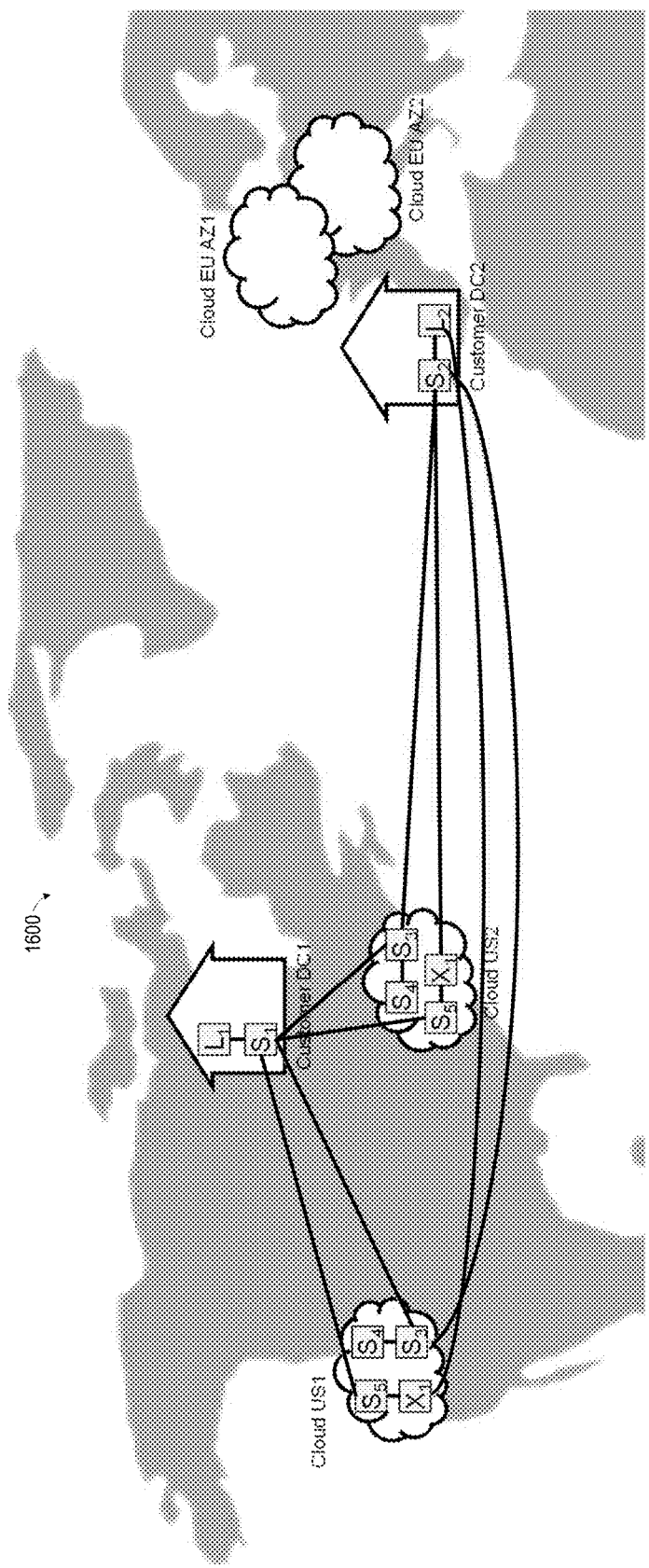
FIG. 16 illustrates geographical locations of deployed services within a proposed computing landscape according to some embodiments.

FIGS. 14 through 16 illustrate simulation of landscapes according to some embodiments. FIG. 14 illustrates current landscape 1400 of a company which has factories located in Canada and Spain, with respective local datacenters DC1 and DC2. These factories include local equipment which may be controlled using local equipment control services $L_1$ and $L_2$ running in respective datacenters DC1 and DC2. Also running in the datacenters are control services $S_1$ and $S_2$ which consume local equipment control services $L_1$ and $L_2$. Control services $S_1$ and $S_2$ also consume a central service $S_3$ that is currently hosted in the Spain datacenter DC2.

Central service $S_3$ consumes another service $S_4$ that has been moved to the cloud. To ensure high availability, $S_4$ is running in two availability zones (i.e., AZ1 and AZ2) of a European cloud provider, one in Ireland, the other in Germany.

Control services $S_1$ and $S_2$ require data from a 3rd party provided by a cloud service $X_1$ on both the US west coast (US1) and US east coast (US2). Control service $S_2$ in Spain calls the 3rd party service $X_1$ directly, preferring the one in US2 but failing over to US1 if needed. Control service $S_1$ in Canada requires an additional adapter service S5 as it cannot call $X_1$ directly. Adapter service S5 is also deployed in US1 and US2, close to the corresponding 3rd party service $X_1$.

It will be assumed that the company wants to evaluate the performance/latency and cost implications of moving central service $S_3$ from the Spain datacenter DC2 to the Canada datacenter DC1. FIG. 15 illustrates landscape 1500 in which central service $S_3$ has moved from the Spain datacenter DC2 to the Canada datacenter DC1. As a second option, landscape 1600 of FIG. 16 depicts movement of central service $S_3$ to the cloud. Since the company only trusts their own datacenters to be available 100% of the time, landscape 1600 reflects running central service $S_3$ in a high availability setup in both US1 and US2.

The change in response time due to moving central service $S_3$ according to each alternative may be determined by generating models of the call map clusters of landscape 1400 and using the models to simulate the effects of latency changes represented by each alternative landscape. The change in response time of each failover scenarios may also be determined.

Figure 17:
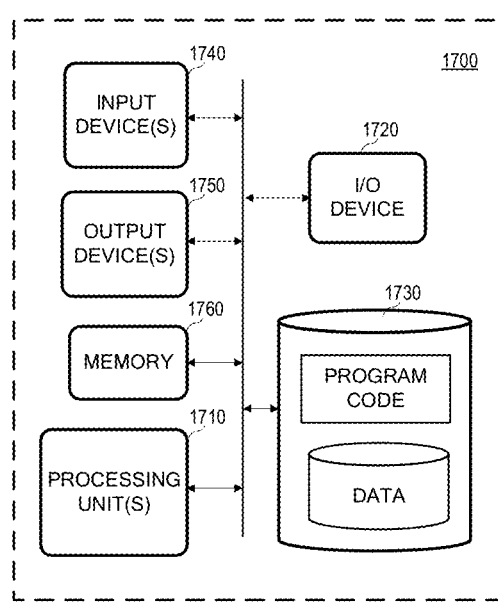
FIG. 17 is a block diagram of a hardware system according to some embodiments.

FIG. 17 is a block diagram of a computing system according to some embodiments. System 1700 may comprise a general-purpose computing apparatus and may execute program code to perform any of the functions described herein, including but not limited to processes 200 and/or 700. System 1700 may be implemented by a standalone computing device, a distributed cloud-based server, or other system and may include other unshown elements according to some embodiments.

System 1700 includes processing unit(s) 1710 operatively coupled to an I/O device 1720, data storage device 1730, one or more input devices 1740, one or more output devices 1750 and memory 1760. I/O device 1720 may facilitate communication with external devices, such as an external network, the cloud, or a data storage device. Input device(s) 1740 may comprise, for example, a keyboard, a keypad, a mouse or other pointing device, a microphone, knob or a switch, an infra-red (IR) port, a docking station, and/or a touch screen. Input device(s) 1740 may be used, for example, to enter information into system 1700. Output device(s) 1750 may comprise, for example, a display (e.g., a display screen) a speaker, and/or a printer.

Data storage device 1730 may comprise any appropriate persistent storage device, including combinations of magnetic storage devices (e.g., magnetic tape, hard disk drives and flash memory), optical storage devices, Read Only Memory (ROM) devices, and RAM devices, while memory 1760 may comprise a RAM device.

Data storage device 1730 stores program code executed by processing unit(s) 1710 to cause system 1700 to implement any of the components and execute any one or more of the processes described herein. Embodiments are not limited to execution of these processes by a single computing device. Data storage device 1730 may also store data and other program code for providing additional functionality and/or which are necessary for operation of system 1700, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remotely from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A method comprising:
   receiving first data representing each of a plurality of calls transmitted between services of a service landscape, the first data representing each call comprising a respective value of an identifier;
   identifying a first plurality of the plurality of calls as comprising a same value of the identifier;
   for each outbound call of the first plurality of calls, determining a hypothesis associating the outbound call with a time delay relative to a preceding inbound call of the first plurality of calls;
   increasing a latency between two services of the service landscape; receiving second data representing each of a second plurality of calls transmitted between the services of the service landscape while the latency is increased, the second data representing each of the second plurality of calls comprising a second same value of the identifier;
   determining an expected timing of each outbound call of the second plurality of calls based on the hypotheses and the increased latency;
   comparing the expected timing of each outbound call of the second plurality of calls with a timing of each outbound call of the second plurality of calls; and
   verifying one or more of the hypotheses based on the comparisons of the expected timing of each outbound call of the second plurality of calls with the timing of each outbound call of the second plurality of calls.

2. The method according to claim 1, further comprising:
based on the verified one or more hypotheses and a proposed latency between two services of the service landscape, determining a response time of the service landscape.

3. The method according to claim 1, wherein determining a hypothesis associating an outbound call with a time delay relative to a preceding inbound call comprises determining, for each inbound call preceding an outbound call, a hypothesis associating the outbound call with a time delay relative to the preceding inbound call.

4. The method according to claim 1, further comprising:
for each outbound call of the second plurality of calls, determining a second hypothesis associating each outbound call of the second plurality of calls with a time delay relative to a preceding inbound call of the second plurality of calls; and
determining that the second plurality of calls corresponds to the first plurality of calls by comparing the second hypotheses to the first hypotheses based on the increased latency.

5. The method according to claim 1, wherein verifying one or more of the hypotheses based on the comparisons comprises:
marking a hypothesis as confirmed if the expected timing of the associated outbound call is substantially equal to the timing of the outbound call within the second plurality of calls and different from the timing of the outbound call within the first plurality of calls; and
marking a hypothesis as invalid if the expected timing of the associated outbound call is not equal to the timing of the outbound call within the second plurality of calls.

6. The method according to claim 1, further comprising:
increasing a second latency between a second two services of the service landscape;
receiving third data representing each of a third plurality of calls transmitted between the services of the service landscape while the second latency is increased, the third data representing each of the third plurality of calls comprising a third same value of the identifier;
determining a second expected timing of each outbound call of the third plurality of calls based on the hypotheses and the second increased latency; and
comparing the second expected timing of each outbound call of the third plurality of calls with a timing of each outbound call of the third plurality of calls, wherein verifying the one or more of the hypotheses is further based on the comparisons of the expected timing of each outbound call of the third plurality of calls with the timing of each outbound call of the third plurality of calls.

7. The method according to claim 1, further comprising:
receiving third data representing each of a third plurality of calls transmitted between the services of the service landscape, the third data representing each call comprising a respective value of the identifier;
identifying a fourth plurality of the third plurality of calls as comprising a same second value of the identifier;
for each outbound call of the fourth plurality of calls, determining a second hypothesis associating the outbound call of the fourth plurality of calls with a time delay relative to a preceding inbound call of the fourth plurality of calls;
receiving fourth data representing each of a fifth plurality of calls transmitted between the services of the service landscape while the latency is increased, the fourth data representing each of the fifth plurality of calls comprising a third same value of the identifier;
determining an expected timing of each outbound call of the fifth plurality of calls based on the second hypotheses and the increased latency;
comparing the expected timing of each outbound call of the fifth plurality of calls with a timing of each outbound call of the fifth plurality of calls; and
verifying one or more of the second hypotheses based on the comparisons of the expected timing of each outbound call of the fifth plurality of calls with the timing of each outbound call of the fifth plurality of calls.

8. The method according to claim 7, further comprising:
based on the verified one or more hypotheses, the verified one or more second hypotheses, and a proposed latency between two services of the service landscape, determining a response time of the service landscape.

9. A non-transitory computer-readable medium storing program code executable by a processing unit to cause a computing system to:
receive first data representing each of a plurality of calls transmitted between services of a service landscape, the first data representing each call comprising a respective value of an identifier;
identify a first plurality of the plurality of calls as comprising a same value of the identifier;
for each outbound call of the first plurality of calls, determine a hypothesis associating the outbound call with a time delay relative to a preceding inbound call of the first plurality of calls;
receive second data representing each of a second plurality of calls transmitted between the services of the service landscape while a latency between two services of the service landscape is increased, the second data representing each of the second plurality of calls comprising a second same value of the identifier;
determine an expected timing of each outbound call of the second plurality of calls based on the hypotheses and the increased latency;
compare the expected timing of each outbound call of the second plurality of calls with a timing of each outbound call of the second plurality of calls;
verify one or more of the hypotheses based on the comparisons of the expected timing of each outbound call of the second plurality of calls with the timing of each outbound call of the second plurality of calls; and
determine a response time of the service landscape based on the verified one or more hypotheses and a proposed latency between two services of the service landscape.

10. The non-transitory computer-readable medium according to claim 9, wherein determination of a hypothesis associating an outbound call with a time delay relative to a preceding inbound call comprises determination, for each inbound call preceding an outbound call, a hypothesis associating the outbound call with a time delay relative to the preceding inbound call.

11. The non-transitory computer-readable medium according to claim 9, the program code further executable by a processing unit to cause a computing system to:
for each outbound call of the second plurality of calls, determine a second hypothesis associating each outbound call of the second plurality of calls with a time delay relative to a preceding inbound call of the second plurality of calls; and determine that the second plurality of calls corresponds to the first plurality of calls by comparing the second hypotheses to the first hypotheses based on the increased latency.

12. The non-transitory computer-readable medium according to claim 9, wherein verification of one or more of the hypotheses based on the comparisons comprises:
marking of a hypothesis as confirmed if the expected timing of the associated outbound call is substantially equal to the timing of the outbound call within the second plurality of calls and different from the timing of the outbound call within the first plurality of calls; and
marking of a hypothesis as invalid if the expected timing of the associated outbound call is not equal to the timing of the outbound call within the second plurality of calls.

13. The non-transitory computer-readable medium according to claim 9, the program code further executable by a processing unit to cause a computing system to:
receive third data representing each of a third plurality of calls transmitted between the services of the service landscape while a second latency between a second two services of the service landscape is increased, the third data representing each of the third plurality of calls comprising a third same value of the identifier;
determine a second expected timing of each outbound call of the third plurality of calls based on the hypotheses and the second increased latency; and
compare the second expected timing of each outbound call of the third plurality of calls with a timing of each outbound call of the third plurality of calls, wherein verification of the one or more of the hypotheses is further based on the comparisons of the expected timing of each outbound call of the third plurality of calls with the timing of each outbound call of the third plurality of calls.

14. The non-transitory computer-readable medium according to claim 9, the program code further executable by a processing unit to cause a computing system to:
receive third data representing each of a third plurality of calls transmitted between the services of the service landscape, the third data representing each call comprising a respective value of the identifier;
identify a fourth plurality of the third plurality of calls as comprising a same second value of the identifier;
for each outbound call of the fourth plurality of calls, determine a second hypothesis associating the outbound call of the fourth plurality of calls with a time delay relative to a preceding inbound call of the fourth plurality of calls;
receive fourth data representing each of a fifth plurality of calls transmitted between the services of the service landscape while the latency is increased, the fourth data representing each of the fifth plurality of calls comprising a third same value of the identifier;
determine an expected timing of each outbound call of the fifth plurality of calls based on the second hypotheses and the increased latency; compare the expected timing of each outbound call of the fifth plurality of calls with a timing of each outbound call of the fifth plurality of calls; and
verifying one or more of the second hypotheses based on the comparisons of the expected timing of each outbound call of the fifth plurality of calls with the timing of each outbound call of the fifth plurality of calls.

15. The non-transitory computer-readable medium according to claim 14, the program code further executable by a processing unit to cause a computing system to:
determine a response time of the service landscape based on the verified one or more hypotheses, the verified one or more second hypotheses, and a proposed latency between two services of the service landscape.

16. A system comprising:
one or more processing units; and
a memory storing program code executable by the one or more processing units to cause the computing system to:
receive first data representing each of a plurality of calls transmitted between services of a service landscape, the first data representing each call comprising a respective value of an identifier;
identify a first plurality of the plurality of calls as comprising a same value of the identifier;
for each outbound call of the first plurality of calls, determine a hypothesis associating the outbound call with a time delay relative to a preceding inbound call of the first plurality of calls;
receive second data representing each of a second plurality of calls transmitted between the services of the service landscape while a latency between two services of the service landscape is increased, the second data representing each of the second plurality of calls comprising a second same value of the identifier;
determine an expected timing of each outbound call of the second plurality of calls based on the hypotheses and the increased latency; compare the expected timing of each outbound call of the second plurality of calls with a timing of each outbound call of the second plurality of calls; and
verify one or more of the hypotheses based on the comparisons of the expected timing of each outbound call of the second plurality of calls with the timing of each outbound call of the second plurality of calls.

17. The system according to claim 16, the program code executable by the one or more processing units to cause the computing system to:
determine a response time of the service landscape based on the verified one or more hypotheses and a proposed latency between two services of the service landscape.

18. The system according to claim 16, the program code executable by the one or more processing units to cause the computing system to:
for each outbound call of the second plurality of calls, determine a second hypothesis associating each outbound call of the second plurality of calls with a time delay relative to a preceding inbound call of the second plurality of calls; and
determine that the second plurality of calls corresponds to the first plurality of calls by comparing the second hypotheses to the first hypotheses based on the increased latency.

19. The system according to claim 16, the program code executable by the one or more processing units to cause the computing system to:
increase a second latency between a second two services of the service landscape;
receive third data representing each of a third plurality of calls transmitted between the services of the service landscape while the second latency is increased, the third data representing each of the third plurality of calls comprising a third same value of the identifier;

determine a second expected timing of each outbound call of the third plurality of calls based on the hypotheses and the second increased latency; and compare the second expected timing of each outbound call of the third plurality of calls with a timing of each outbound call of the third plurality of calls, wherein verification of the one or more of the hypotheses is further based on the comparisons of the expected timing of each outbound call of the third plurality of calls with the timing of each outbound call of the third plurality of calls.

20. The system according to claim 16, the program code executable by the one or more processing units to cause the computing system to:

receive third data representing each of a third plurality of calls transmitted between the services of the service landscape, the third data representing each call comprising a respective value of the identifier;

identify a fourth plurality of the third plurality of calls as comprising a same second value of the identifier;

for each outbound call of the fourth plurality of calls, determine a second hypothesis associating the outbound call of the fourth plurality of calls with a time delay relative to a preceding inbound call of the fourth plurality of calls;

receive fourth data representing each of a fifth plurality of calls transmitted between the services of the service landscape while the latency is increased, the fourth data representing each of the fifth plurality of calls comprising a third same value of the identifier;

determine an expected timing of each outbound call of the fifth plurality of calls based on the second hypotheses and the increased latency;

compare the expected timing of each outbound call of the fifth plurality of calls with a timing of each outbound call of the fifth plurality of calls; verify one or more of the second hypotheses based on the comparisons of the expected timing of each outbound call of the fifth plurality of calls with the timing of each outbound call of the fifth plurality of calls; and determine a response time of the service landscape based on the verified one or more hypotheses, the verified one or more second hypotheses, and a proposed latency between two services of the service landscape.

* * * * *